(12) United States Patent
Lee

(10) Patent No.: US 11,189,146 B2
(45) Date of Patent: Nov. 30, 2021

(54) FIRE DETECTOR HAVING RESET FUNCTION LINKED WITH LAMP AND FIRE WARNING METHOD USING SAME

(71) Applicant: KOREA LAND & HOUSING CORPORATION, Jinju-si (KR)

(72) Inventor: Ki Hong Lee, Seoul (KR)

(73) Assignee: KOREA LAND & HOUSING CORPORATION, Jinju-si (KR)

( * ) Notice: Subject to any disclaimer, the term of this patent is extended or adjusted under 35 U.S.C. 154(b) by 0 days.

(21) Appl. No.: 17/252,111

(22) PCT Filed: Feb. 20, 2020

(86) PCT No.: PCT/KR2020/002444
§ 371 (c)(1),
(2) Date: Dec. 14, 2020

(87) PCT Pub. No.: WO2020/171616
PCT Pub. Date: Aug. 27, 2020

(65) Prior Publication Data
US 2021/0256827 A1 Aug. 19, 2021

(30) Foreign Application Priority Data
Feb. 21, 2019 (KR) .......... 10-2019-0020527

(51) Int. Cl.
*G08B 17/12* (2006.01)
(52) U.S. Cl.
CPC .................. *G08B 17/12* (2013.01)

(58) Field of Classification Search
CPC ........ G08B 29/145; G08B 17/00; G08B 7/06; G08B 17/10; G08B 7/064; G08B 25/009; F21V 33/0076
See application file for complete search history.

(56) References Cited

U.S. PATENT DOCUMENTS

| 2012/0218099 A1* | 8/2012 | Egawa | .................. G08B 25/009 340/502 |
| 2017/0018154 A1* | 1/2017 | Wen | ..................... G08B 27/001 |

(Continued)

FOREIGN PATENT DOCUMENTS

| JP | H07-161477 A | 6/1995 |
| JP | 2005-234880 A | 9/2005 |

(Continued)

OTHER PUBLICATIONS

International Search Report for PCT/KR2020/002444 dated May 29, 2020 from Korean Intellectual Property Office.

*Primary Examiner* — Mirza F Alam
(74) *Attorney, Agent, or Firm* — Paratus Law Group, PLLC

(57) ABSTRACT

Disclosed is a fire detector and a fire warning method. The fire detector includes: a fire sensor detecting a factor corresponding to fire; and a controller determining whether a fire has occurred, by using a sensed value of the fire sensor, and determining whether a reset event is generated, through an on/off state of the lamp. The fire warning method includes: performing, by a controller, monitoring for a fire; determining, by the controller, whether a fire has occurred; and giving a warning when it is determined that a fire has occurred, and simultaneously determining whether a reset event is generated, through an on/off state of a lamp.

4 Claims, 2 Drawing Sheets

(56) References Cited

U.S. PATENT DOCUMENTS

2020/0054905 A1\* 2/2020 Livchak ................ A62C 3/006
2020/0402381 A1\* 12/2020 Nelson ................... F21V 15/01
2021/0049885 A1\* 2/2021 Lee ........................ G08B 25/14

FOREIGN PATENT DOCUMENTS

| KR | 20-0258735 Y1 | 12/2001 |
| KR | 10-1475390 B1 | 12/2014 |
| KR | 10-1563655 B1 | 10/2015 |
| KR | 10-2016-0139925 A | 12/2016 |
| KR | 10-1784424 B1 | 10/2017 |

\* cited by examiner

FIRE DETECTOR HAVING RESET FUNCTION LINKED WITH LAMP AND FIRE WARNING METHOD USING SAME

CROSS-REFERENCE TO PRIOR APPLICATIONS

This application is a National Stage Patent Application of PCT International Patent Application No. PCT/KR2020/002444 (filed on Feb. 20, 2020) under 35 U.S.C. § 371, which claims priority to Korean Patent Application No. 10-2019-0020527 (filed on Feb. 21, 2019), which are all hereby incorporated by reference in their entirety.

BACKGROUND

The present disclosure relates to a fire detector and a fire warning method using the same. More particularly, the present disclosure relates to a fire detector, and a fire warning method using the fire detector, wherein a fire warning is reset through a link with a lamp.

A fire detector refers to a component that directly detects a fire in a facility equipped with automatic fire detection or a facility equipped with automatic fire extinguishing. Examples of the fire detector include: a differential-temperature detector using expansion of air; and a heat detector using accumulation of heat. Further, the fire detectors are broadly divided into a compensation-type detector using expansion of air and accumulation of heat simultaneously, and a smoke detector detecting smoke. In addition, according to the detection method, fire detectors are classified into a spot-type detector that detects a local part, and a line-type detector that detects the entire area. The types of commonly used detectors include a differential-temperature spot type, a differential-temperature line type, a compensation spot type, a fixed-temperature spot type, a linear fixed-temperature type, an ionization type, a photoelectric type, a complex heat type, a complex smoke type, a complex heat smoke type, and the like.

A signal from the detector is received by a receiver that is powered by electricity. Further, as a warning, a bell rings and simultaneously, a transmitter notifies the fire department, and the like of fire. Therefore, reliability and preservation of devices or wires constituting a fire warning facility are enormously important. In addition, with respect to a method of installing a detector in a target building, or the like or with respect to a heat-resistant wire and a fire-resistant wire, detailed installation standards are stipulated in fire regulations.

A fire detector is installed on the ceiling. Therefore, while the fire detector gives a fire warning, in order to stop (reset) the fire warning, a person must approach the fire detector on the ceiling and press a reset button of the fire detector. In particular, when a fire detector gives a fire warning even in the case of no fire, it is necessary to quickly reset the fire detector so as to prevent neighborhood residents from getting confused.

However, a resident with limited mobility, for example, an elder who lives alone, may have difficulty in resetting the fire detector on the ceiling.

Documents of Related Art

1. Korean Patent No. 10-1784424 (publication date: Oct. 12, 2017, FIRE DETECTOR LINKED OTHERS)

2. Korean Patent No. 10-1563655 (publication date: Oct. 27, 2015, MULTI FUNCTION FIRE DETECTOR)

SUMMARY

The present disclosure is directed to providing a fire detector, and a fire warning method using the fire detector, wherein resetting is facilitated even for a resident with limited mobility.

According to an exemplary embodiment of the present disclosure, there is provided a fire detector having a reset function linked with a lamp, the fire detector including: a fire sensor detecting a factor corresponding to fire; and a controller determining whether a fire has occurred, by using a sensed value of the fire sensor, and determining whether a reset event is generated, through an on/off state of the lamp.

Herein, the fire detector may further include an illumination sensor detecting illumination of a space where the fire detector is installed, wherein the controller may detect a change in the illumination in an interior of the space by using a sensed value of the illumination sensor.

In addition, when the state of the lamp is changed from the on state to the off state, or from the off state to the on state, the controller determines that the reset event is generated, through a sensed value of an illumination sensor.

Further, when the number of times that the change between the on state and the off state of the lamp takes place exceeds a preset number of times, the controller determines that the reset event is generated.

In addition, the controller terminates a fire warning when it is determined that the reset event is generated.

According to an exemplary embodiment of the present disclosure, there is provided a fire detecting method including: performing, by a controller, monitoring for a fire; determining, by the controller, whether a fire has occurred; giving a warning when it is determined that a fire has occurred, and simultaneously determining whether a reset event is generated, through an on/off state of a lamp.

Herein, the determining of whether the reset event is generated may be performed by detecting a change in illumination of an interior space.

In addition, when the state of the lamp is changed from the on state to the off state, or from the off state to the on state, the controller determines that the reset event is generated.

Further, when the number of times that the change between the on state and the off state of the lamp takes place exceeds a preset number of times, the controller determines that the reset event is generated.

In addition, the controller terminates the fire warning when it is determined that the reset event is generated.

The present disclosure facilitates the resetting of the fire detector, through a lamp switch installed on the wall.

DETAILED DESCRIPTION

Figure 1:
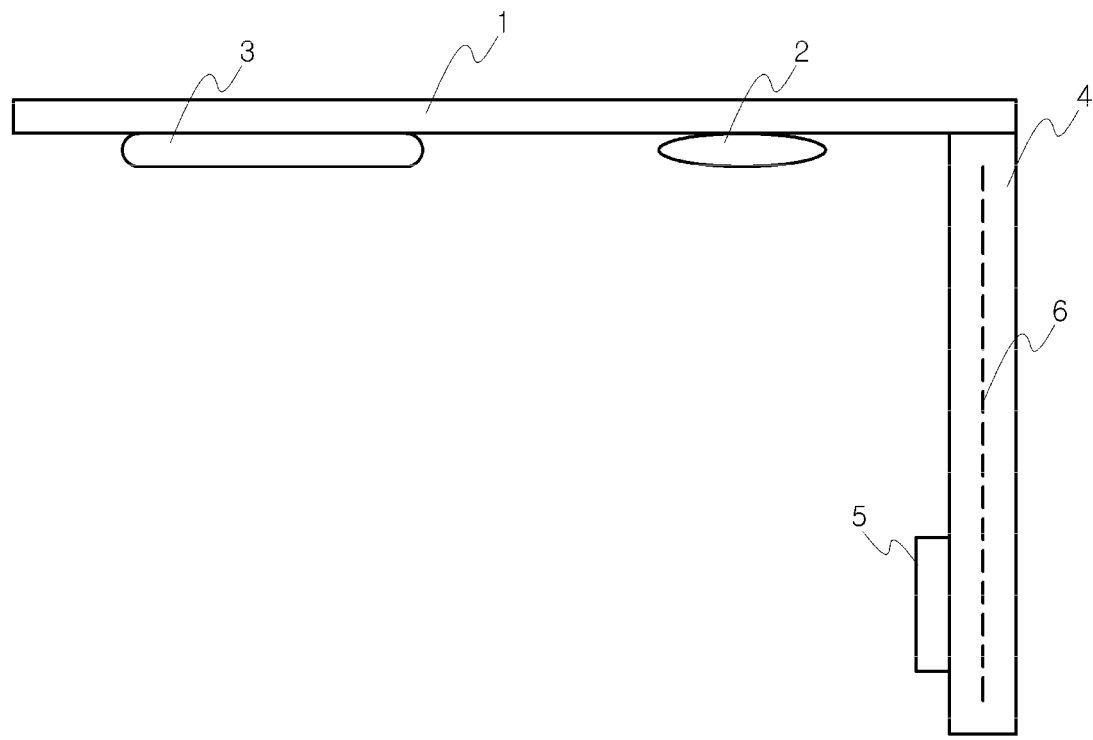
FIG. 1 is a schematic diagram illustrating an interior of a building where a fire detector is installed, according to an exemplary embodiment of the present disclosure.

The present disclosure may be modified in various ways and implemented by various embodiments, so that specific embodiments are shown in the drawings and will be described in detail. However, the present disclosure is not limited thereto, and the exemplary embodiments can be construed as including all modifications, equivalents, or substitutes in a technical concept and a technical scope of the present disclosure.

The similar reference numerals refer to the similar elements described in the drawings. In describing the present disclosure, it is decided that if a detailed description of the known art related to the present disclosure makes the subject matter of the present disclosure unclear, the detailed description will be omitted.

Terms "first", "second", etc. used in the specification can be used to describe various elements, but the elements are not to be construed as being limited to the terms. The terms are only used to differentiate one element from other elements.

For example, the "first" element may be named the "second" element without departing from the scope of the present disclosure, and the "second" element may also be similarly named the "first" element.

The term "and/or" includes a combination of multiple related provided items or any one of them.

It will be understood that when an element is referred to as being "coupled" or "connected" to another element, it can be directly coupled or connected to the other element or intervening elements may be present therebetween.

In contrast, it will be understood that when an element is referred to as being "directly coupled" or "directly connected" to another element, there are no intervening elements present.

The terms used in the present application are merely used to describe particular embodiments, and are not intended to limit the present disclosure.

As used herein, the singular forms "a", "an", and "the" are intended to include the plural forms as well, unless the context clearly indicates otherwise. In the present application, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless otherwise defined, all terms including technical and scientific terms used herein have the same meaning as commonly understood by those skilled in the art to which the present disclosure belongs.

It will be further understood that terms used herein should be interpreted as having a meaning that is consistent with their meaning in the context of this application and the relevant art and will not be interpreted in an idealized or overly formal sense unless expressly so defined herein.

Figure 2:
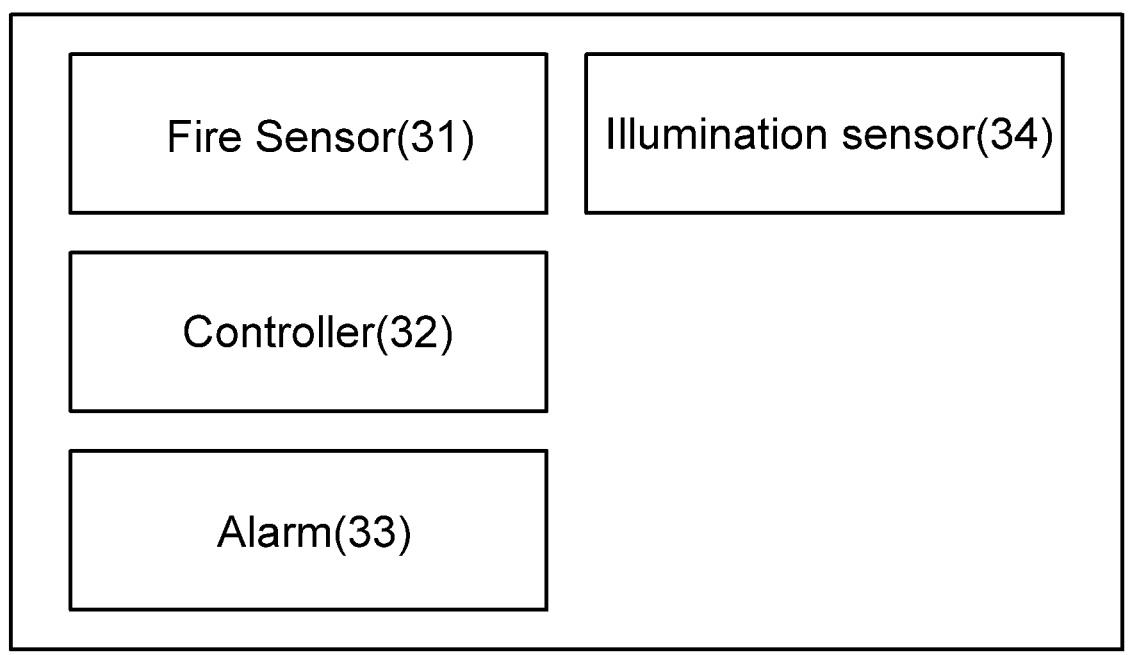
FIG. 2 is a functional block diagram illustrating a fire detector of FIG. 1.

Hereinafter, a fire detector according to an exemplary embodiment of the present disclosure will be described with reference to FIGS. 1 and 2. FIG. 1 is a schematic diagram illustrating an interior of a building where a fire detector is installed, according to an exemplary embodiment of the present disclosure. FIG. 2 is a functional block diagram illustrating a fire detector of FIG. 1.

Referring to FIG. 1, a ceiling 1 and a wall 4 are provided in an interior of a building. Herein, the interior may be a living room. On the ceiling 1, a lamp 2 and a fire detector 3 may be installed. The lamp 2 may be an LED lamp. The lamp 2 may be supplied with normal power through a power line 6. The power supplied to the lamp 2 may be controlled by a wall switch 5. The lamp 2 may be turned on/off according to an on/off state of the wall switch 5. The fire detector 3 may be installed spaced apart from the lamp 2.

Referring to FIG. 2, the fire detector 3 may include a fire sensor 31, a controller 32, an alarm 33, and an illumination sensor 34.

The fire sensor 31 may detect a factor corresponding to fire, in a known manner. For example, the fire sensor 31 may be a smoke sensor.

The controller 32 may receive a sensed value of the fire sensor 31 in real time and may use the sensed value to determine whether a fire has occurred.

When it is determined that a fire has occurred through the sensed value of the fire sensor 31, the controller 32 provides a warning voice or a warning sound through the alarm 33.

When it is determined that a fire has occurred, the controller 32 activates the illumination sensor 34. While the controller 32 determines that a fire has not occurred, the illumination sensor 34 remains in an inactive state and does not perform a sensing operation.

Being in an active state, the illumination sensor 34 detects the illumination.

The controller 32 may use a sensed value of the illumination sensor 34 to determine whether a reset event is generated. By using the sensed value of the activated illumination sensor 34, the controller 32 determines that the reset event is generated when there is a change between an on state and an off state of the lamp 2. For example, when the lamp 2 is in the on state at the time point that fire is detected and when the lamp 2 is turned off through the wall switch after the time point that fire is detected, the illumination changes from a high state to a low state. This is recognized by the controller 32 through the sensed value of the illumination sensor 34. Conversely, when the lamp 2 is in the off state at the time point that fire is detected and when the lamp 2 is turned on through the wall switch after the time point that fire is detected, the illumination changes from a low state to a high state. This is recognized by the controller 32 through the sensed value of the illumination sensor 34. In order to reduce erroneous detection, the controller 32 determines that a reset event is generated only when the number of times that the change between the on state and the off state of the lamp 2 takes place exceeds a preset number of times (for example, three times). The controller 32 stores an illumination value in advance which is provided when the lamp 2 is turned on. When the change in illumination corresponds to a preset percentage of the pre-stored illumination value provided when the lamp 2 is turned on, it is recognized that operations of turning on and off the lamp take place.

When it is determined that the reset event is generated, the controller 32 terminates the warning from the alarm 34.

As described above, according to the present disclosure, since a fire alarm is reset through the wall switch, even a person with limited mobility is able to easily reset the fire alarm. In addition, according to the present disclosure, once a fire alarm having a function of determining whether a reset event is generated is installed in the interior of a building, it is simple to determine whether the reset event is generated, through the change in illumination. That is, according to the present disclosure, it is simple to establish a fire warning system having a reset function, by only installing the fire alarm in an interior where a lighting is mounted. In addition, since the reset event is recognized using the illumination of the lighting, it is only necessary to add an illumination sensor to an existing fire alarm and apply the idea that the controller is linked to the illumination sensor. Consequently, while minimizing a change of the existing fire alarm, it is possible to provide the fire alarm having the reset function.

Hereinafter, a fire detecting method according to an exemplary embodiment of the present disclosure will be described with reference to FIGS. 1 to 3.

Figure 3:
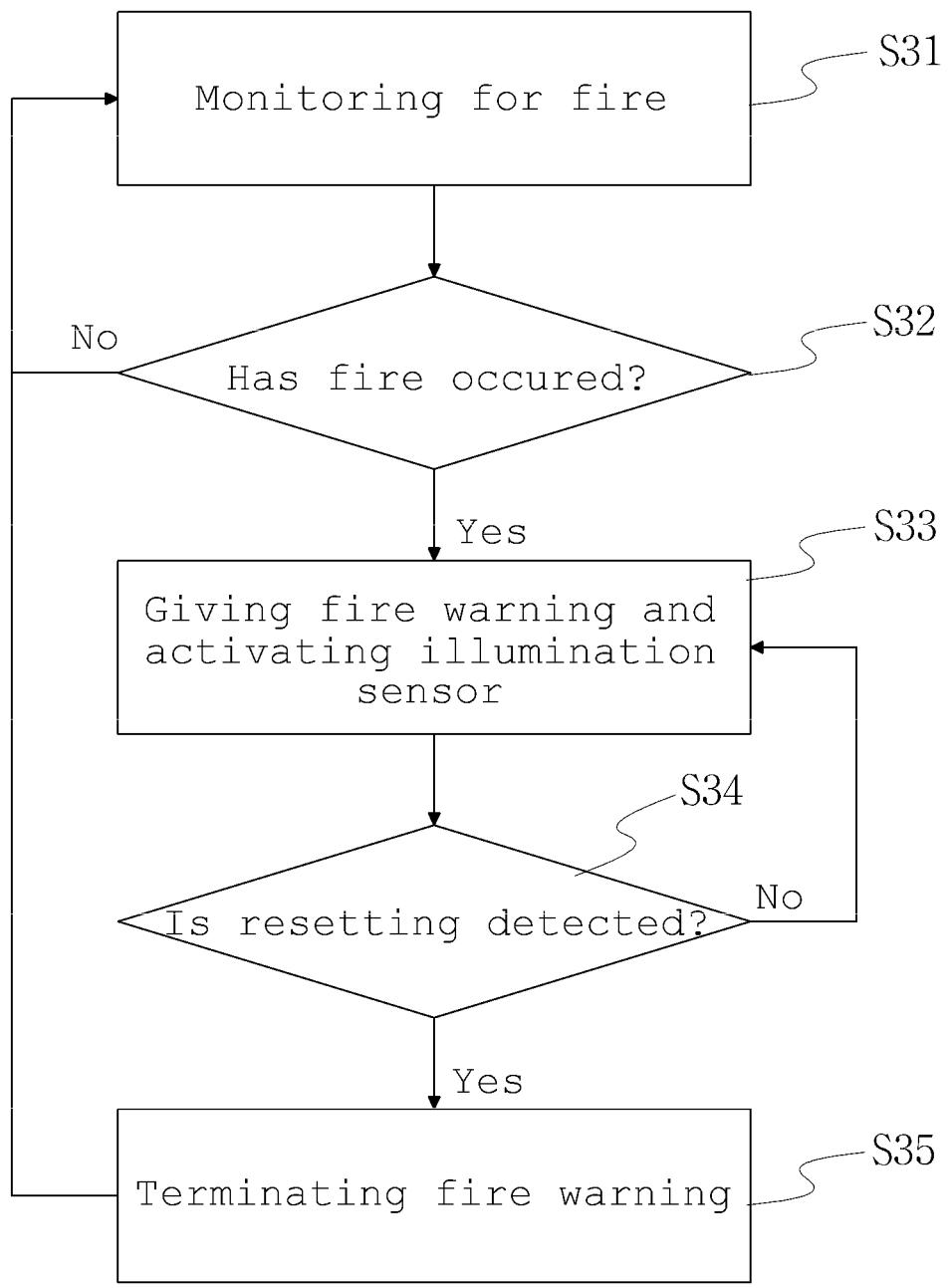
FIG. 3 is a flowchart illustrating a fire detecting method according to an exemplary embodiment of the present disclosure.

FIG. 3 is a flowchart illustrating a fire detecting method according to an exemplary embodiment of the present disclosure.

First, the controller 32 performs real-time fire monitoring by using the sensed value of the fire sensor 31 at step S31. Herein, the illumination sensor 34 may be in an inactive state.

The controller 32 determines whether a fire has occurred, by using the sensed value of the fire sensor 31 at step S32.

When it is determined that a fire has not occurred at step S32, proceeding back to step S31 takes place.

When it is determined that a fire has occurred at step S32, the controller 32 provides a warning voice or a warning sound through the alarm 33 and activates the illumination sensor 34 at step S33.

The controller 32 determines whether the reset event is generated, by using the sensed value of the activated illumination sensor 34 at step S34. Herein, by using the sensed value of the activated illumination sensor 34, the controller 32 may determine that the reset event is generated when there is a change between the on state and the off state of the lamp 2. For example, when the lamp 2 is in the on state at the time point that fire is detected and when the lamp 2 is turned off through the wall switch after the time point that fire is detected, the illumination changes from a high state to a low state. This is recognized by the controller 32 through the sensed value of the illumination sensor 34. Conversely, when the lamp 2 is in the off state at the time point that fire is detected and when the lamp 2 is turned on through the wall switch after the time point that fire is detected, the illumination changes from a low state to a high state. This is recognized by the controller 32 through the sensed value of the illumination sensor 34. In order to reduce erroneous detection, the controller 32 determines that a reset event is generated only when the number of times that the change between the on state and the off state of the lamp 2 takes place exceeds a preset number of times (for example, three times).

When it is determined that the reset event is generated, the controller 32 terminates the warning from the alarm 34 at step S35.

When it is determined that the reset event is not generated at step S34, the fire warning keep on being given.

The invention claimed is:

1. A fire detector having a reset function linked with a lamp lighting a room, the fire detector comprising:
a fire sensor detecting a factor corresponding to fire;
an illumination sensor configured to sense an illumination value of the lamp in the room where the fire detector is installed, when being activated; and
a controller determining whether a fire has occurred, by using a sensed value of the fire sensor, activating the illumination sensor when the fire is detected, detecting a change of an on-off state of the lamp based on the illumination value sensed by the illumination sensor, determining whether a reset event is generated based on detected change of the on-off state of the lamp, and terminating a fire warning when it is determined that the reset event is generated.

2. The fire detector of claim 1, wherein when the on-off state of the lamp is changed from an on state to an off state, or from the off state to the on state when the illumination sensor is activated, the controller detects the change of the on-off state of the lamp through a change of the illumination value sensed by the illumination sensor, and the controller determines that the reset event is generated when a number of times of the detected change of the on-off state of the lamp exceeds a preset number of times.

3. A fire detecting method comprising:
performing, by a controller with a fire sensor, monitoring for a fire;
determining, by the controller, whether a fire has occurred;
activating, by the controller, an illumination sensor configured to sense an illumination value of a lamp in a room where the controller monitors for the fire, when it is determined that the fire has occurred;
outputting a fire warning when it is determined that the fire has occurred
detecting, by the controller, a change of an on-off state of the lamp based on the illumination value sensed by the illumination sensor;
determining, by the controller, whether a reset event is generated based on detected change of the on-off state of the lamp; and
terminating the fire warning when it is determined that the reset event is generated.

4. The fire detecting method of claim 3, wherein when the on-off state of the lamp is changed from an on state to an off state, or from the off state to the on state when the illumination sensor is activated, the controller detects the change of the on-off state of the lamp through a change of the illumination value sensed by the illumination sensor, and the controller determines that the reset event is generated when a number of times of the detected change of the on-off state of the lamp exceeds a preset number of times.

* * * * *